United States Patent
Evans et al.

(10) Patent No.: US 9,422,995 B2
(45) Date of Patent: Aug. 23, 2016

(54) BRAKE INSULATOR WITH THERMAL BARRIER

(71) Applicant: FORD GLOBAL TECHNOLOGIES, LLC, Dearborn, MI (US)

(72) Inventors: Charles K. Evans, Willis, MI (US); Chris Oakwood, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 18 days.

(21) Appl. No.: 14/099,301

(22) Filed: Dec. 6, 2013

(65) Prior Publication Data

US 2015/0159716 A1    Jun. 11, 2015

(51) Int. Cl.
*F16D 65/84* (2006.01)
*F16D 65/78* (2006.01)
*F16D 69/00* (2006.01)

(52) U.S. Cl.
CPC ......... *F16D 65/84* (2013.01); *F16D 2065/785* (2013.01); *F16D 2069/006* (2013.01)

(58) Field of Classification Search
CPC ............. F16D 2065/785; F16D 65/84; F16D 65/092; F16D 2200/006; F16D 2200/0078
See application file for complete search history.

(56) References Cited

U.S. PATENT DOCUMENTS

| | | | |
|---|---|---|---|
| 4,240,530 A * | 12/1980 | Tillenburg | 188/250 E |
| 4,603,760 A * | 8/1986 | Myers | F16D 65/0006 188/250 R |
| 5,811,042 A * | 9/1998 | Hoiness | 264/122 |
| 6,105,736 A * | 8/2000 | Akita et al. | 188/73.37 |
| 6,306,989 B1 * | 10/2001 | Bloom et al. | 526/200 |
| 6,729,445 B1 * | 5/2004 | Qian et al. | 188/264 G |
| 8,211,272 B2 * | 7/2012 | Levit et al. | 162/157.3 |
| 2005/0085146 A1 * | 4/2005 | Farkas | B32B 5/24 442/134 |
| 2006/0137943 A1 * | 6/2006 | Mayrhofer et al. | 188/250 B |

(Continued)

FOREIGN PATENT DOCUMENTS

| | | |
|---|---|---|
| CN | 101514252 A | 8/2009 |
| CN | 201751622 U | 2/2011 |

(Continued)

OTHER PUBLICATIONS

"Carbotech Compounds and Applications", Carbotech Performance Brakes: http:/ctbrakes.com/faqs.asp 12 pages, Jun. 30, 2013.

(Continued)

*Primary Examiner* — Vishal Sahni
(74) *Attorney, Agent, or Firm* — Jones Robb, PLLC; Raymond L. Coppiellie

(57) ABSTRACT

A brake caliper for a brake system of a vehicle includes a caliper body, a piston, and a brake insulator. The piston may be positioned at least partially inside the caliper body. The brake insulator includes a fabric and is positioned adjacent to a face of the piston. The brake insulator may have a thickness of about 0.75 mm to about 1.5 mm. The brake insulator may include a fabric connected to the piston and the fabric may include polymeric elements. According to at least one exemplary embodiment, a brake insulator for a brake caliper may include a fabric having a plurality of elements positioned relative to one another to create a plurality of interstices between the elements. The interstices may include air pockets and the brake insulator may have a thickness of about 0.75 mm to about 1.5 mm. A vehicle may include the exemplary embodiments of the brake insulator and the brake caliper.

24 Claims, 10 Drawing Sheets

(56) References Cited

U.S. PATENT DOCUMENTS

| | | | |
|---|---|---|---|
| 2006/0289250 A1* | 12/2006 | Dobrusky et al. | 188/73.37 |
| 2009/0250189 A1* | 10/2009 | Soukhojak | C09K 5/063 165/10 |
| 2010/0133050 A1* | 6/2010 | Arbesman | F16D 65/0006 188/73.35 |
| 2010/0140029 A1* | 6/2010 | Parild | F16D 65/0006 188/73.37 |
| 2011/0311753 A1* | 12/2011 | Faria et al. | 428/66.2 |
| 2012/0152667 A1* | 6/2012 | Bosco, Jr. | 188/251 R |

FOREIGN PATENT DOCUMENTS

| | | |
|---|---|---|
| JP | H10037990 A | 2/1998 |
| JP | 2005024030 A | 1/2005 |

OTHER PUBLICATIONS

Machine prepared English language translation of JPH10037990-A.

Machine prepared English language translation of JP2005024030-A.

\* cited by examiner

BRAKE INSULATOR WITH THERMAL BARRIER

TECHNICAL FIELD

Aspects of the present disclosure relate to an insulator for a brake of a vehicle, as well as a vehicle and a brake caliper including the insulator.

BACKGROUND

An issue with braking devices is the generation of heat due to friction between a brake device and a wheel of a vehicle, which may be transferred through the brake device to brake fluid used to actuate the brake device. As a result, the temperature of the brake fluid may increase to the point that the brake fluid boils, causing a loss of braking capability. If this issue is not detected and addressed at an early stage during the development of a brake device, reengineering of the brake device can be expensive and difficult.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, a brake caliper comprises a caliper body, a piston, and a brake insulator. The piston is positioned at least partially inside the caliper body. The brake insulator comprises a fabric and positioned adjacent to a face of the piston. According to at least one exemplary embodiment, the brake insulator has a thickness of about 0.75 mm to about 1.5 mm.

In accordance with at least one exemplary embodiment, a brake caliper comprises a caliper body, a piston, and a brake insulator. The piston is positioned at least partially inside the caliper body. The brake insulator comprises a fabric connected to the piston and the fabric comprises polymeric elements.

In accordance with at least one exemplary embodiment a brake insulator for a brake caliper comprises a fabric comprising a plurality of elements positioned relative to one another to create a plurality of interstices between the elements. In accordance with at least one exemplary embodiment, the interstices comprise air pockets. The brake insulator may have a thickness of about 0.75 mm to about 1.5 mm.

In accordance with at least one exemplary embodiment, a vehicle comprises a wheel, a rotor coupled to the wheel, and a brake caliper configured to engage the rotor. In accordance with at least one exemplary embodiment, the brake caliper comprises a caliper body, a piston, a brake pad, and a brake insulator. The brake insulator comprises a fabric including a plurality of elements arranged to form a plurality of interstices between the elements. In accordance with at least one exemplary embodiment, the interstices comprise air pockets. The brake insulator may be located between the piston and the brake pad. In accordance with at least one exemplary embodiment, the brake insulator has a thickness of about 0.75 mm to about 1.5 mm.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present disclosure and together with the description serve to explain certain principles and operation.

DETAILED DESCRIPTION

In accordance with various exemplary embodiments, the present disclosure contemplates various exemplary embodiments of an insulator for a braking device of a vehicle. The insulator may be used, for example, in a brake caliper, such as between a brake pad and the brake caliper. The insulator may include a fabric made of a non-flammable material. The fabric may include elements, such as fibers, that are woven together or provided in a non-woven arrangement. The elements of the fabric, whether woven or non-woven, provide interstices between the elements of the fabric. The interstices between elements of the fabric may provide air pockets to reduce the thermal conductivity of the insulator. Thus, the insulator may provide insulation due to both the non-flammable material of the fabric and due to the air pockets within interstices between elements of the fabric. The fabric may have a thickness of, for example, about 0.05 mm to about 0.3 mm. An insulator including the fabric may have a thickness of, for example about 0.75 mm to about 1.5 mm. The insulator may include a single layer of fabric or may have a layered structure that includes a layer of the fabric and other layers. The insulator may be used in a brake caliper of a vehicle. At least one side of the insulator may be bonded to the brake caliper, such as via an adhesive.

Figure 1:
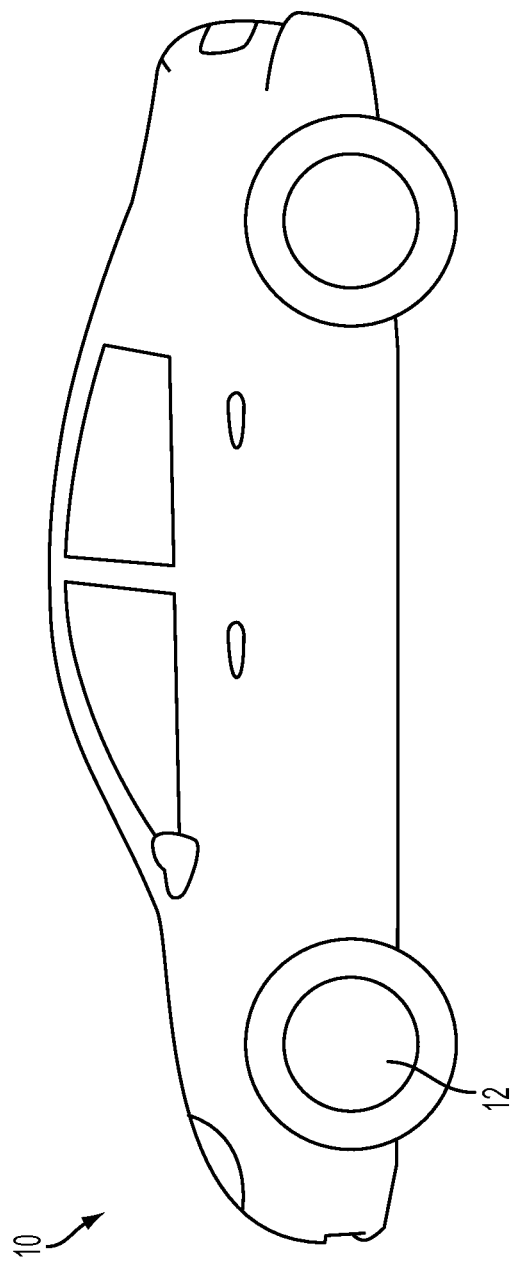
FIG. 1 is a side view of a vehicle, according to an exemplary embodiment.

Turning to FIG. 1, a schematic side view of an exemplary embodiment of a vehicle 10 is shown, which includes a wheel 12. As depicted in the exemplary embodiment of FIG. 1, vehicle 10 may be an automobile, such as, for example, a passenger car. However, the various exemplary embodiments described herein may be used in other types of automobiles and other types of vehicles familiar to one skilled in the art, such as, for example, work vehicles, construction vehicles, and other vehicles one skilled in the art is familiar with. Vehicle 10 may include a braking system (not shown) to slow and/or stop rotation of wheel 12, and therefore the travel of vehicle 10.

Figure 2:
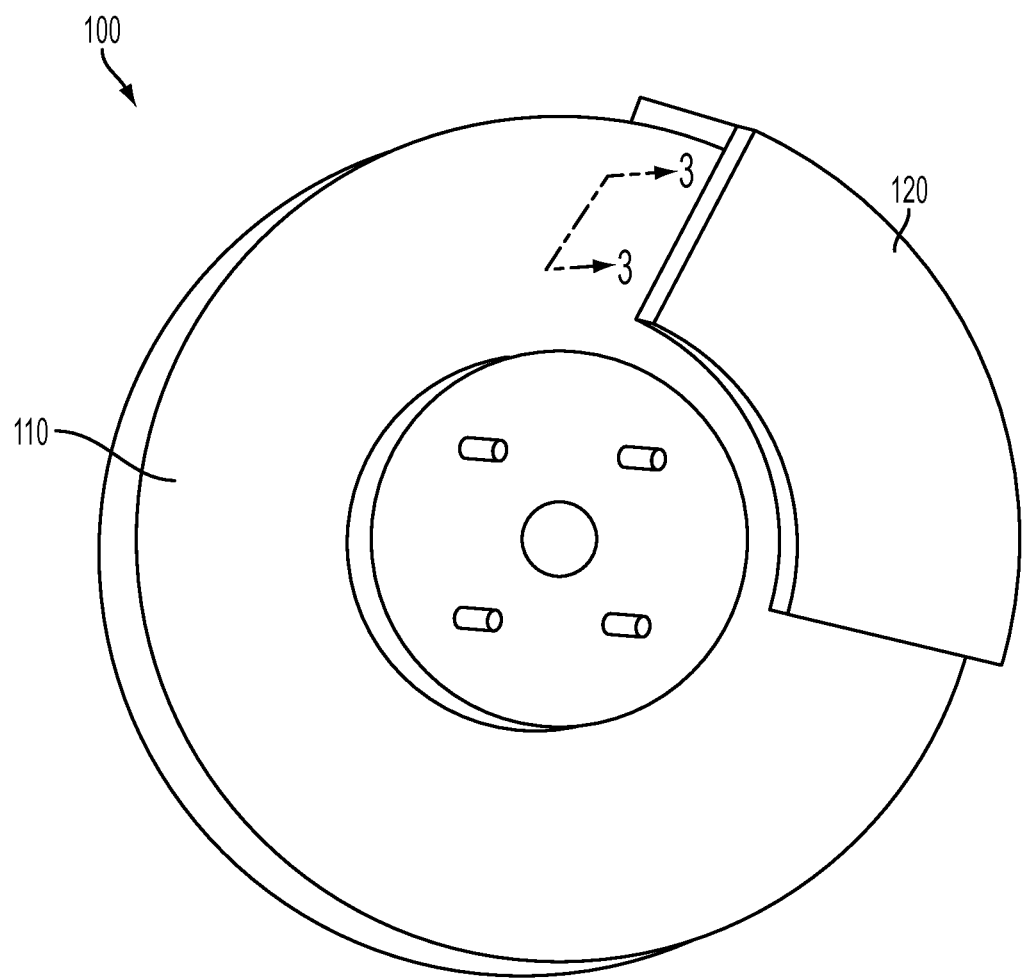
FIG. 2 is a perspective view of a portion of a brake device for a vehicle, according to an exemplary embodiment.

FIG. 2 shows a perspective view of a portion of a brake device 100 for a wheel of a vehicle, such as the wheel 12 of vehicle 10 of the exemplary embodiment of FIG. 1. As shown in the exemplary embodiment of FIG. 2, brake device 100 may include a rotor 110 and a brake caliper 120. As would be understood by one skilled in the art, rotor 110 may be coupled to a wheel of a vehicle (not shown) and thus rotate as the wheel turns, while brake caliper 120 may be configured to apply a force to rotor 110 to slow and/or stop the rotation of rotor 110, and thus the wheel of the vehicle.

Figure 3:
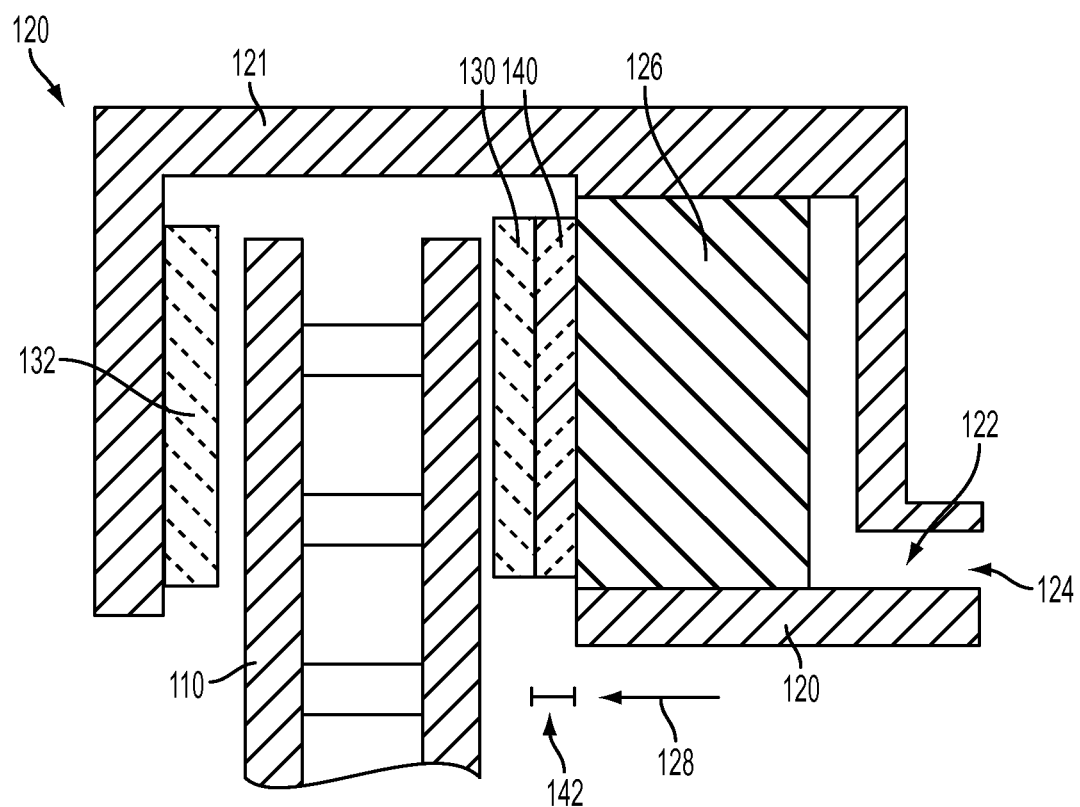
FIG. 3 is a cross-sectional view along line 3-3 in FIG. 2 in accordance with the present teachings.

Turning to FIG. 3, which is a cross-sectional view along line 3-3 of FIG. 2, the engagement between brake caliper 120 and rotor 110 will now be described. As shown in the exemplary embodiment of FIG. 3, a body 121 of brake caliper 120 includes a fluid passage 122 through which hydraulic fluid 124 may enter, such as from a braking system (not shown) of a vehicle, when a brake pedal (not shown) is depressed by a driver of the vehicle. When hydraulic fluid 124 is forced through passage 122 of brake caliper 120, the hydraulic fluid 124 presses against a piston 126, causing a piston 126 to be urged in direction 128 towards rotor 110. As a result, a brake pad 130, which is fastened to piston 126 and facing rotor 110, is pressed against the rotor 110. The movement of piston 126 in direction 128 also causes a second brake pad 132, located opposite to brake pad 130 and fastened to brake caliper 120, to be pressed against rotor 110.

Pressing of brake pads 130, 132 against rotor 110 slows and/or stops the rotation of rotor 110 and a vehicle wheel couple to rotor 110. However, the braking process results in the kinetic energy of rotor 110 being converted to friction and heat between rotor 110 and brake pads 130, 132. The heat produced during braking may be conducted through brake pad 130, through piston 126, and to hydraulic fluid 124. If the hydraulic fluid 124 were heated to a sufficient temperature, the hydraulic fluid 124 would boil, reducing the ability of the hydraulic fluid to effectively transmit hydraulic pressure, move piston 126, and cause braking of rotor 110.

To address possible conduction of heat from brake pad 130, a layer of thermal insulative material may be located between brake pad 130 and piston 126. For instance, the thermal insulative material may be included in a brake insulator 140 located between brake pad 130 and piston 126, as shown in the exemplary embodiment of FIG. 3. The insulator 140 may, for example, also function as a noise insulator to reduce noise created when brake pad 130 is pressed against rotor 110. However, the amount of space provided between a piston 126 and a rotor 110 is limited. Further, the space between piston 126 and rotor 110 may be predetermined by the geometry of the brake caliper 120 and rotor 110, which may already be in use and require retrofitting. Thus, the use of the space between the rotor 110 and piston 126 by insulator 140 may result in a reduction of thickness of the brake pad 130, which in turn may lead to a diminished service life of brake pad 130. Conversely, if the thickness of the insulator 140 is reduced to permit a larger thickness for brake pad 130, the ability of the insulator 140 to reduce noise and minimize thermal conduction of heat from brake pad 130 may be diminished. As a result, it may be desirable to maximize the ability of an insulator for a braking device to reduce or eliminate conduction of heat from a brake pad while minimizing a thickness of the insulator. Further, noise reduction properties of the insulator may be maintained or increased as well.

Figure 4:
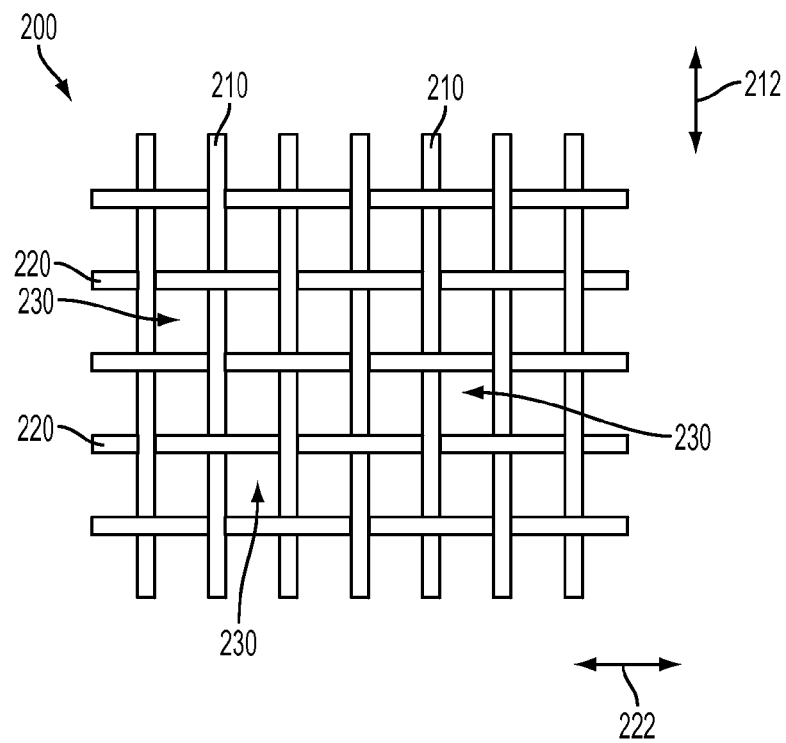
FIG. 4 is a top view of a woven fabric for a brake insulator, according to an exemplary embodiment of the present teachings.

In various exemplary embodiments described herein, an insulator for a braking device may include a thermally insulative fabric, which may reduce an overall thickness of the insulator while maintaining or increasing the insulation capability of the insulator. The fabric may be joined to a lining assembly of a brake device, according to an exemplary embodiment. Although the fabric may be described in various embodiments as being used in an insulator, such as with other materials of an insulator to reduce noise, the fabric may be used in a braking device without being included in an insulator. According to an exemplary embodiment, the fabric may be a woven material or a non-woven material. Turning to FIG. 4, an exemplary embodiment of a woven fabric 200 is shown, which includes first elements oriented in first direction 212 and second elements 220 oriented in a second direction 222. For example, one of first direction 212 and second direction 222 may be a warp direction and the other of first direction 212 and second direction 222 may be a weft direction for woven fabric 200. According to an exemplary embodiment, elements 210 and 220 may be woven at a pitch of, for example, about 200 to about 400 elements per inch. Further, although fabric 200 may include the woven pattern depicted in the exemplary embodiment of FIG. 4, other woven patterns may be utilized that one skilled in the art is familiar with. According to an exemplary embodiment, fabric 200 may have a thickness of, for example, about 0.05 mm to about 0.3 mm. According to another exemplary embodiment, fabric 200 may have a thickness of, for example, about 0.1 mm to about 0.2 mm.

Figure 5:
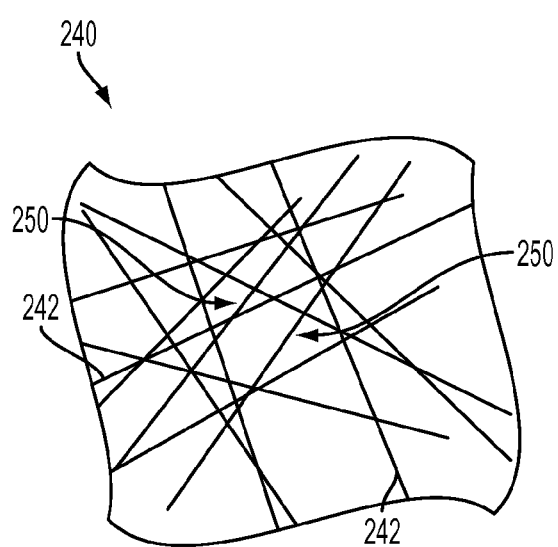
FIG. 5 is a top view of a non-woven fabric for a brake insulator, according to an exemplary embodiment of the present teachings.

According to another exemplary embodiment, fabric 240 may be a non-woven fabric, as shown in FIG. 5. For instance, non-woven fabric 240 may include elements 242 randomly oriented together. Non-woven fabric 240 may be, for example, a non-woven mesh, felt, or other type of non-woven fabric familiar to one skilled in the art. According to an exemplary embodiment, fabric 240 may have a thickness of, for example, about 0.05 mm to about 0.3 mm.

According to another exemplary embodiment, fabric 240 may have a thickness of, for example, about 0.1 mm to about 0.2 mm. Elements 210, 220, and 242 may be, for example, fibers, filaments, or other types of elongated elements familiar to one skilled in the art and may be made of a non-flammable material, which will be discussed below. Elements 210, 220, 242 may have, for example, a circular cross-section, an oval cross-section, or other cross-sectional shapes for elements one skilled in the art is familiar with, according to an exemplary embodiment. All elements 210, 220, 242 of a fabric may be made of the same material, according to an exemplary embodiment, or a fabric may include elements 21, 220, 242 made of differing materials. As a result, the material of elements 210, 220, and 242 may provide fabric 200, 240 with insulative properties and thus may minimize the conduction of heat through the fabric 200 or 240.

As shown in the exemplary embodiments of FIGS. 4 and 5, the woven fabric 200 and the non-woven fabric 240 may include interstices between elements of the fabrics 200, 240. In other words, woven fabric 200 and non-woven fabric 240 are not completely dense and include gaps between the elements making the fabrics 200, 240. For example, elements 210, 220 of woven fabric 200 are woven so that interstices 230 (i.e., gaps) are provided between elements 210, 220, as shown in the exemplary embodiment of FIG. 4. In another example, elements 242 of non-woven fabric 240 may include interstices 250 (i.e., gaps) between elements 242, as shown in the exemplary embodiment of FIG. 5. According to an exemplary embodiment, interstices 230, 250 may provide pockets of air between the respective elements 210, 220, 242 of fabrics 200, 240. The pockets of air provide additional insulation for the fabrics 200, 240 due to the low heat conduction of the air within the interstices 230, 250. Thus, not only may fabrics 200, 240 provide thermal insulation due to the materials that elements 210, 220, 242 are made of, but fabrics 200, 240 further provide thermal insulation due to the air within interstices 230, 250. According to an exemplary embodiment, elements 210 and 220 may be woven at a pitch of, for example, about 200 to about 400 elements per inch. Further, elements 242 may be distributed in non-woven fabric 240 to provide an element density substantially equivalent to a pitch of, for example, about 200 to about 400 elements per inch. Further, because interstices 230, 250 are provided between the elements 210, 220, 242 that fabrics 200, 240 are made of, interstices 230, 250 may be distributed substantially throughout fabrics 200, 240. In addition, because interstices 230, 250 are formed by elements 210, 220, 242 of a fabric 200, 240 instead of being formed as, for example, holes formed in or through a surface, which may produce sharp corners that may concentrate stress, fabrics 200, 240 may provide a more durable configuration than a layer that includes holes formed in or through the layer.

According to an exemplary embodiment, the elements of a fabric (e.g., elements 210, 220 of fabric 200 and elements 242 of fabric 240) may be made of a non-flammable material. The material may be, for example, a polymer, such as, for example, an aromatic polyamide (aramid). An example of an aramid that may be used for the elements of a fabric in the various exemplary embodiments described herein is poly (m-phenylene isophthalamide), which is available under the name Nomex® from DuPont™ of Wilmington, Del. According to another exemplary embodiment, the non-flammable material may be provided in the form of glass fibers, carbon fibers, or other non-flammable materials one skilled in the art is familiar with.

As discussed above with regard to the exemplary embodiment of FIG. 3, a space provided for both a brake pad and a brake insulator may be limited, or even predetermined in the case of a brake system already in use and requiring retrofitting. As a result, it is desirable to provide a brake insulator that has a small thickness but also minimizes or eliminates conduction of heat from a brake pad. A thickness of a brake insulator including a fabric for the various exemplary embodiments described herein, such as thickness 142 of insulator 140 shown in the exemplary embodiment of FIG. 3, may be, for example, about 0.75 mm to about 1.5 mm. In another exemplary embodiment, a thickness of a brake insulator may be, for example, about 0.90 mm to about 1.2 mm. An insulator may include other materials than the fabric embodiments described herein. For example, an insulator may include, in addition to the fabric, noise insulation materials, such as, for example, rubber or other noise insulation materials, metals layers, such as one or more layers of steel, and/or bond layers, such as layers of adhesive or other bonding agents. Although a brake insulator of the various embodiments described herein may be thin, which advantageously permits a brake pad to have a relatively large thickness and thus a relatively long service life, the brake insulator may still minimize or eliminate heat conduction from the brake pad because of the insulative properties of the fabric included in the brake insulator. As a result, there is little or no trade-off or compromise between brake pad thickness and the insulative properties of the brake insulator.

A brake insulator may be bonded to components of a brake device according to various methods. According to an exemplary embodiment, a brake insulator may be bonded to a component of a brake device, such as a brake pad, piston, or other component, via, for example, adhesive bonding, mechanical fastener, molding, and other bonding methods familiar to one skilled in the art. According to an exemplary embodiment, interstices between elements of the fabric of a brake insulator are not filled as a result of the bonding process, permitting the interstices to serve as air pockets that enhance the insulative properties of the fabric.

Figure 6:
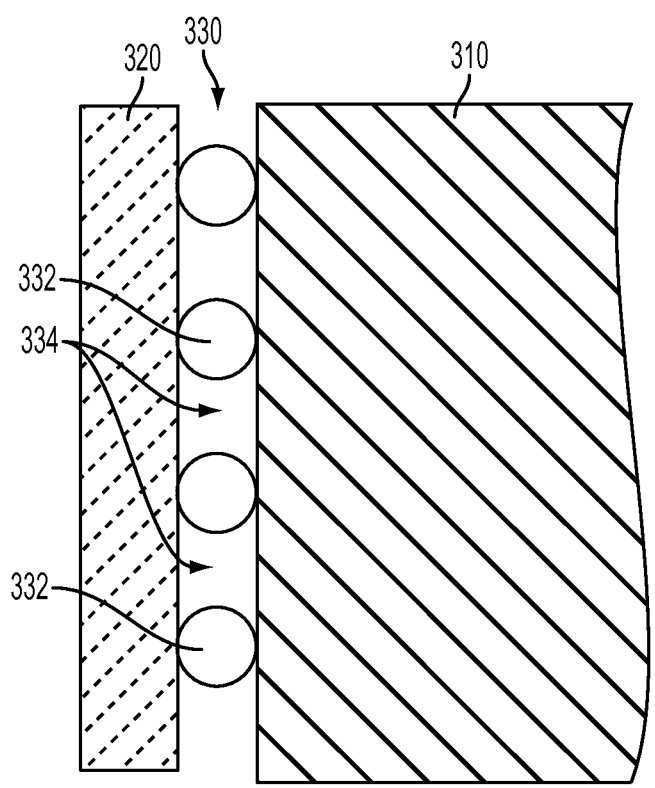
FIG. 6 is a side cross-sectional view of a brake device including a brake insulator bonded to a brake pad and piston of the brake device, according to an exemplary embodiment of the present teachings.

Turning to FIG. 6, a side cross-sectional view is shown of a caliper piston 310, brake pad 320, and an insulative fabric 330 bonded to the piston 310 and the brake pad 320. Fabric 330 may be configured according to the various exemplary embodiments described herein. For instance, although fabric 330 is depicted as a woven fabric in the exemplary embodiment of FIG. 6, with elements 332 extending into and out of the page of FIG. 6, fabric 330 may be a non-woven fabric. As shown in the exemplary embodiment of FIG. 6, although fabric 330 is bonded to brake pad 320 and to piston 310, interstices 334 between elements 332 may be maintained, permitting interstices 334 to serve as air pockets. Further, although fabric 330 is depicted as being bonded to brake pad 320 in the exemplary embodiment of FIG. 6, fabric 330 may be bonded to a component holding brake pad 320, such as a shoeplate, instead of being directly bonded to brake pad 320.

Figure 7:
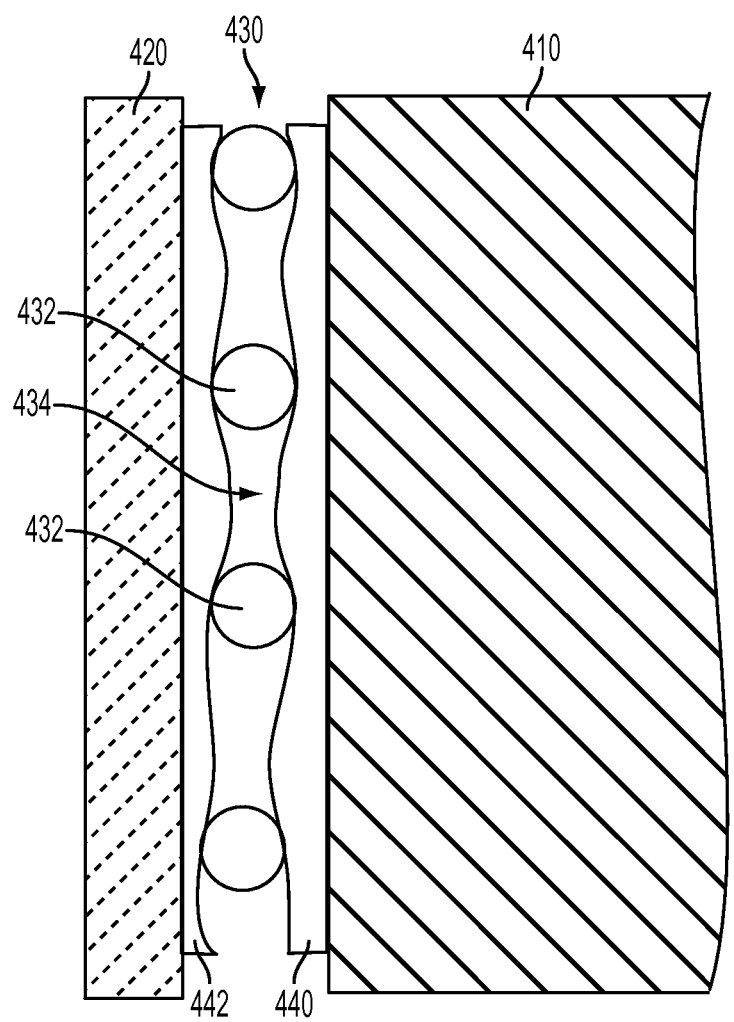
FIG. 7 is a side cross-sectional view of a brake device including a brake insulator adhesively bonded to a brake pad and piston of the brake device, according to an exemplary embodiment of the present teachings.

Turning to FIG. 7, an exemplary embodiment of a caliper piston 410, brake pad 420, and an insulative fabric 430 respectively bonded to the piston 410 and the brake pad 420 via adhesive 440, 442. According to an exemplary embodiment, adhesive 440, 442 may be, for example, an air setting acrylic adhesive cured for about twenty-four to about forty-eight hours at room temperature. The adhesive may be applied to one or more layers via, for example, passing the one or more layers and adhesive between rollers compressing the one or more layers and adhesive. As discussed with regard to the exemplary embodiment of FIG. 6 above, fabric 430 may be bonded to piston 410 and brake pad 420 so that interstices 434 between elements 432 of fabric 430 are maintained, even when adhesive 440, 442 is used to bond fabric 430 to piston 410 and brake pad 420, as shown in the exemplary embodiment of FIG. 7. In other words, bonding of fabric 430 to piston 410 and brake pad 420 does not result in adhesive 440, 442 merging together to fill interstices 434. As a result, interstices 434 may serve as air pockets and contribute to the insulative nature of fabric 430. Further, although two layers of adhesive 440, 442 is shown in the exemplary embodiment of FIG. 7, fabric 430 may be bonded to piston 410 and brake pad 420 via other methods, such as, for example, a single layer adhesive to one side of fabric 430, such as to bond fabric 430 to either of piston 410 and brake pad 420 and use another bonding method to bond fabric 430 to the other of piston 410 and brake pad 420.

Figure 8:
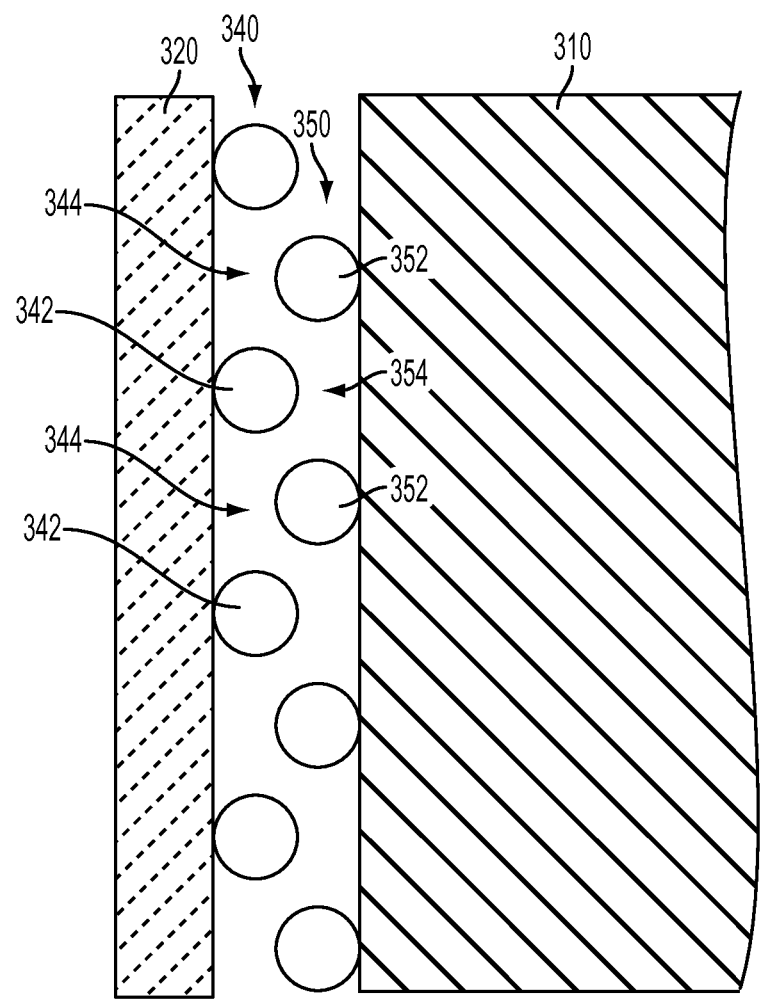
FIG. 8 is a side cross-sectional view of a brake device including a brake insulator, which includes first and second fabric layers, bonded to a brake pad and piston of the brake device, according to an exemplary embodiment of the present teachings.

A fabric may be provided as a single layer of fabric in a brake insulator, as shown in the exemplary embodiments of FIGS. 6 and 7. However, the various exemplary embodiments described herein are not limited to a single layer of fabric and may instead include a plurality of layers of fabric, such as, for example, two layers of fabric, three layers of fabric, four layers of fabric, or more layers of fabric. Thus, a brake insulator may have a layered structure that includes one or more layers of fabric. For instance, as shown in the exemplary embodiment of FIG. 8, a first fabric layer 340 and a second fabric layer 350 may be provided between a caliper piston 310 and a brake pad 320, with first fabric layer 340 including elements 342 and interstices 344 and second fabric layer 350 including elements 352 and interstices 354. Elements 342, 352 and interstices 344, 354 of first fabric layer 340 and second fabric layer 350 may be respectively staggered or offset from one another, as shown in the exemplary embodiment of FIG. 8, or the elements 342, 352 and interstices 344, 354 of first fabric layer 340 and second fabric layer 350 may be aligned with one another. According to an exemplary embodiment, a layered structure of a brake insulator may include other materials than a non-flammable fabric, such as, for example, noise dampening materials and/or bonding materials. FIGS. 9-13 show various exemplary embodiments of brake insulators including layered structures, which will be discussed below.

Figure 9:
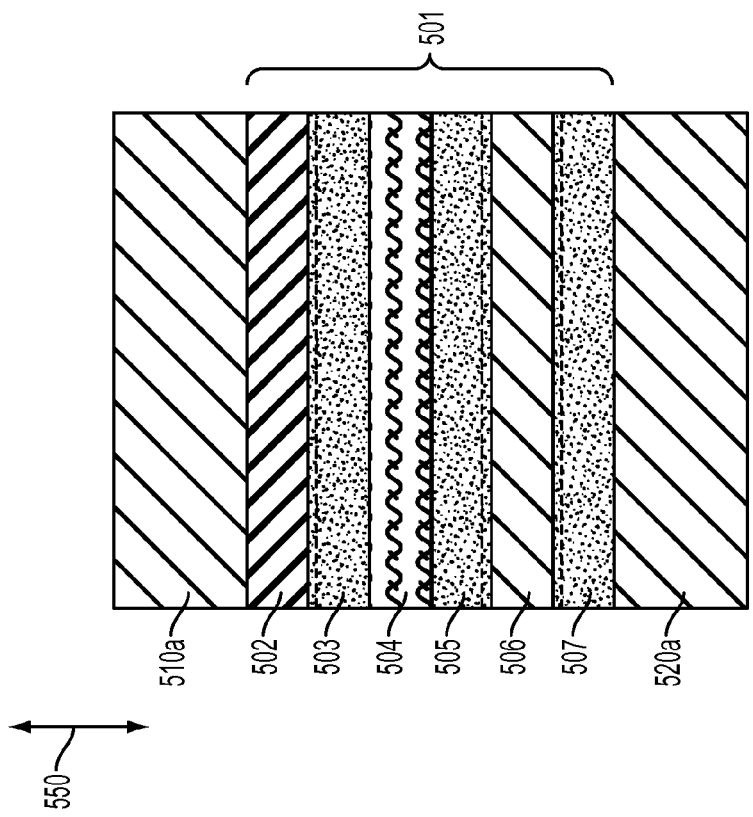
FIG. 9 is a side cross-sectional view of a brake insulator with a layered structure bonded to a brake pad of a brake device, according to an exemplary embodiment of the present teachings.

FIG. 9 shows a side cross-sectional view of a brake insulator 501 having a layered structure bonded to a piston 510a and a brake pad 520a of a brake device, according to an exemplary embodiment. In the exemplary embodiment of FIG. 9, brake insulator 501 includes a layer 502 of noise insulating material, such as, for example, rubber or other noise insulating material familiar to one skilled in the art, such as, for example, silicone; a fabric layer 504 (which may be configured according to the various exemplary embodiments described above); a bond layer 503 between the fabric layer 504 and the noise insulation layer 502, such as, for example, a layer of adhesive; a metal layer 506 for noise insulation, such as, for example, a layer of steel; a bond layer 505 between the fabric layer 504 and the metal layer 506, such as, for example, a layer of adhesive; and a bond layer 507 between metal layer 506 and brake pad 520a, such as, for example, an adhesive. Further, although brake insulator 501 is depicted as being bonded to a brake pad 520a in the exemplary embodiment of FIG. 9, brake insulator 501 may instead be bonded to other components of a brake device, such as, for example a shoe plate for a brake pad. Similarly, although the brake insulators of the various exemplary embodiments of FIGS. 9-13 may be depicted as being bonded to a brake pad, the brake insulators may instead be bonded to other components of a brake device.

According to an exemplary embodiment, the layers of brake insulator 501 may have the following thicknesses in directions 550 shown in FIG. 9. Noise insulating layer 502 may have a thickness of, for example, about 0.01 mm to about 0.04 mm. Metal layer 506 may have a thickness of, for example, about 0.008 mm to about 0.040 mm, although greater thicknesses may be selected for increased noise dampening. Bond layers 503, 505, and 507 may each have a thickness of, for example, 0.003 mm to about 0.020 mm. Further, insulator 501 may have a thickness in directions 550 of, for example, about 0.05 mm to about 0.3 mm.

Figure 10:
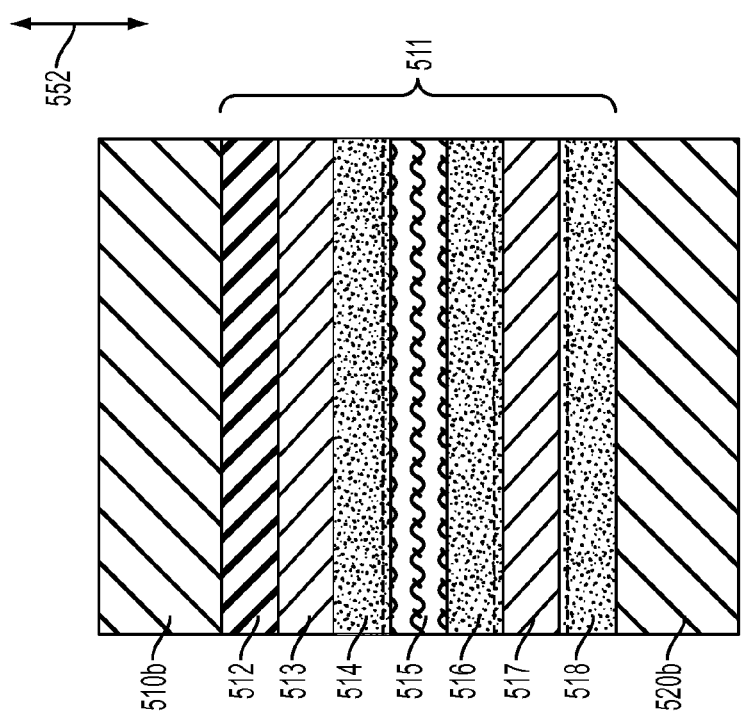
FIG. 10 is a side cross-sectional view of a brake insulator with a layered structure bonded to a brake pad of a brake device, according to an exemplary embodiment of the present teachings.

Turning to FIG. 10, a side cross-sectional view is shown of a brake insulator 511 with a layered structure bonded to a piston 510b and a brake pad 520b of a brake device, according to an exemplary embodiment. Brake insulator 511 may be similar to the brake insulator 501 of the exemplary embodiment of FIG. 8 and include, for example, a noise insulation layer 512, a bond layer 514, a fabric layer 515, a bond layer 516, a metal layer 517, and a bond layer 518. However, brake insulator 511 may further include a second metal layer 513, such as, for example, a layer of steel, which may provide additional noise insulation for brake insulator 511. Noise insulation layer 512, fabric layer 515, metal layers 512 and 517, and bond layers 514, 516, 518 may have the same thicknesses in directions 552 shown in FIG. 10 as discussed above for the corresponding layers of FIG. 9 (i.e., noise insulation layer 512 may have the same thickness as noise insulation layer 502, metal layers 513 and 517 may each have the same thickness as metal layer 506, fabric layer 515 may have the same thickness as fabric layer 504, and bond layers 514 and 518 may each have the same thickness as any of bond layers 503, 505, 507).

Figure 11:
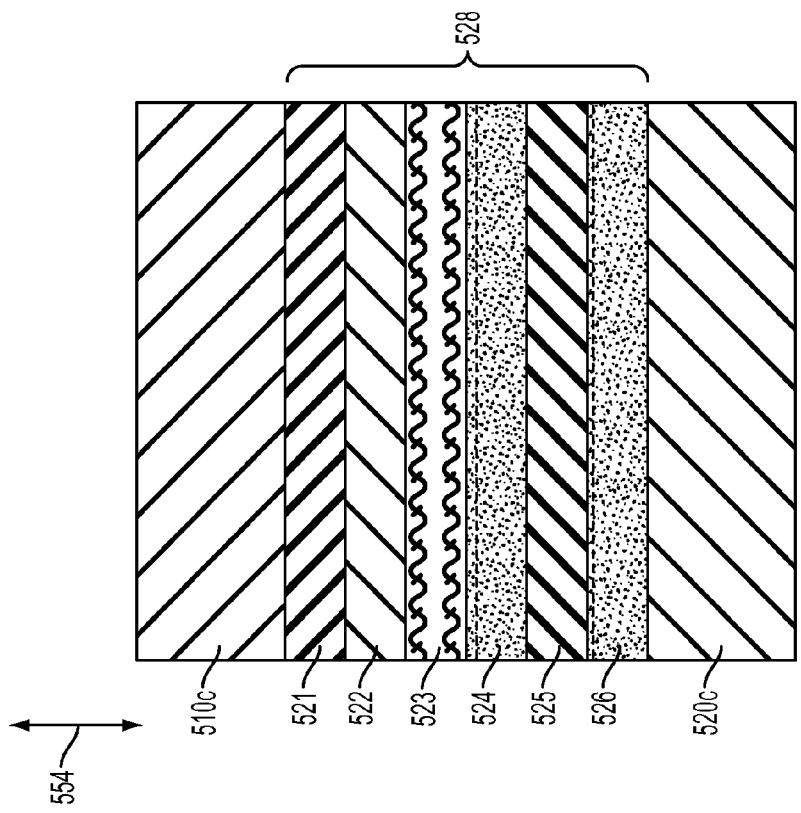
FIG. 11 is a side cross-sectional view of a brake insulator with a layered structure bonded to a brake pad of a brake device, according to an exemplary embodiment of the present teachings.

FIG. 11 shows a side cross-sectional view of a brake insulator 528 with a layered structure bonded to a piston 510c and a brake pad 520c of a brake device, according to an exemplary embodiment. Brake insulator 528 may be similar to the brake insulator 501 of the exemplary embodiment of FIG. 9 and include, for example, a noise insulation layer 521, a fabric layer 523, a bond layer 524, and a bond layer 526. However, brake insulator 528 may include a second metal layer 521, such as, for example, a layer of steel, instead of the noise insulation layer 502 of the exemplary embodiment of FIG. 9, which may be, for example, a rubber layer. Further, brake insulator 528 of the exemplary embodiment of FIG. 11 may include a second insulation layer 525, such as, for example, a layer of rubber, instead of the metal layer 506 of the exemplary embodiment of FIG. 9. Fabric layer 523, metal layer 522, insulation layers 521 and 525, and bond layers 522, 524, 526 may have the same thicknesses in directions 554 shown in FIG. 11 as discussed above for the corresponding layers of FIG. 8 (i.e., each of noise insulation layers 521 and 525 may have the same thickness as noise insulation layer 502, metal layer 522 may have the same thickness as metal layer 506, fabric layer 523 may have the same thickness as fabric layer 504, and bond layers 524 and 526 may each have the same thickness as any of bond layers 503, 505, 507).

Figure 12:
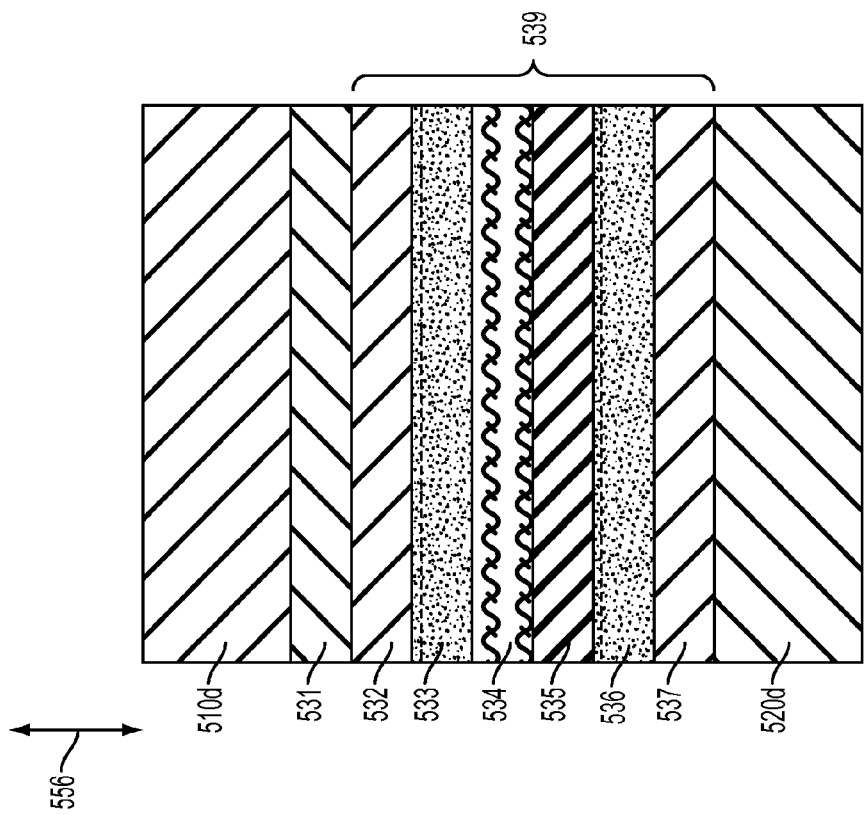
FIG. 12 is a side cross-sectional view of a brake insulator with a layered structure mechanically fastened to a brake pad e of a brake device, according to an exemplary embodiment of the present teachings.

FIG. 12 shows a side cross-sectional view of a brake insulator 539 with a layered structure connected to a piston 510d and to a brake pad 520d of a brake device, according to an exemplary embodiment. In contrast with the exemplary embodiments of FIGS. 9-11, brake insulator 539 is mechanically fastened to piston 530 and/or brake pad 538, such as, for example, by clipping brake insulator 539 to either or both of piston 530 and brake pad 538. A clip may be formed, for example, by stamping tabs into a metal layer and bending the tabs past ninety degrees towards a shoe plate of a brake caliper so that the tabs may engage an edge of the shoe plate and snap in place, according to an exemplary embodiment. For instance, if brake insulator 539 is mechanically fastened to only one of piston 510d and brake pad 520d, brake insulator 539 may be bonded to the other of piston 510d and brake pad 520d according to the various exemplary embodiments discussed above. As shown in the exemplary embodiment of FIG. 12, a mechanical connection 531 may be provided between piston 510d and brake insulator 539. Mechanical connection 531 may be, for example, a cover shim or other mechanical connection familiar to one skilled in the art. For example, a mechanical connection 531 may be a post projecting from a shoeplate of a caliper that extends through the insulator, which may be subsequently riveted to retain the insulator on the post. Brake insulator 539 may include, for example: a first metal layer 532, such as, for example, a layer of steel, a bond layer 533, a fabric layer 534, an insulation layer 535, a bond layer 536, and a second metal layer 537. Fabric layer 535, metal layers 532 and 537, insulation layer 535, and bond layers 533 and 536 may have the same thicknesses in directions 556 shown in FIG. 12 as discussed above for the corresponding layers of FIG. 9 (i.e., noise insulation layer 535 may have the same thickness as noise insulation layer 502, metal layers 532 and 537 may each have the same thickness as metal layer 506, fabric layer 535 may have the same thickness as fabric layer 504, and bond layers 533 and 536 may each have the same thickness as any of adhesive layers 503, 505, 507).

Figure 13:
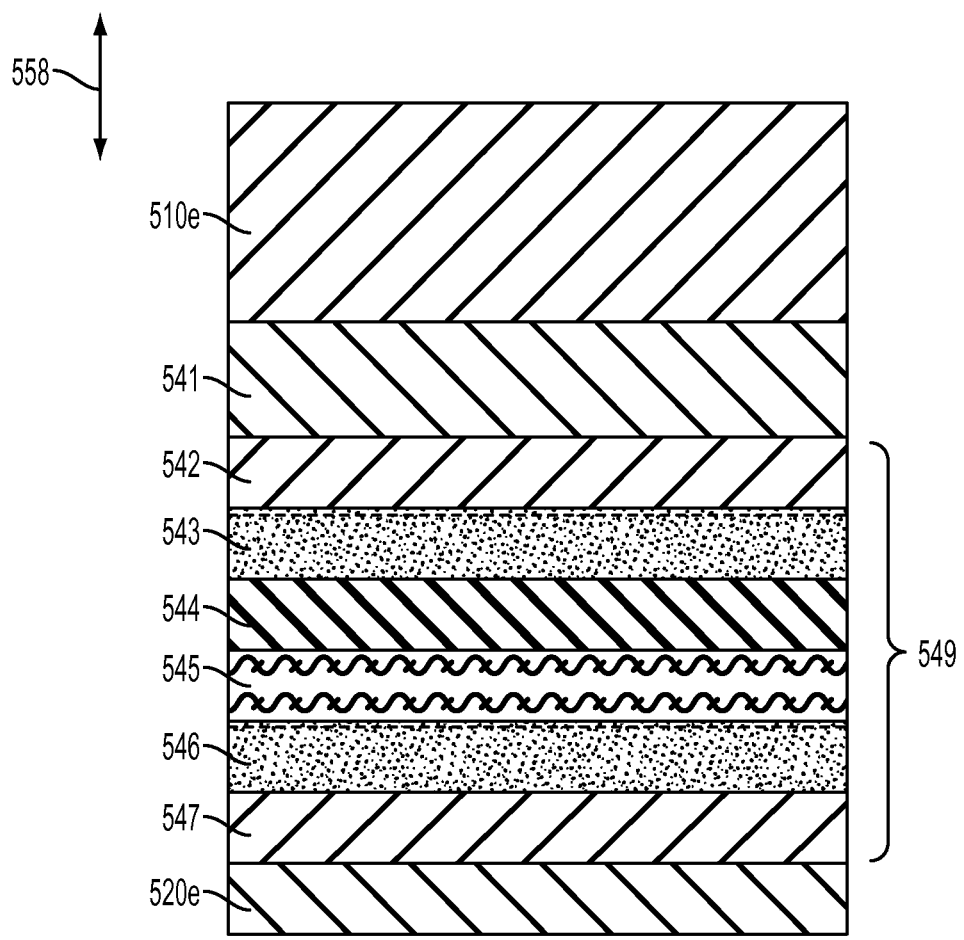
FIG. 13 is a side cross-sectional view of a brake insulator with a layered structure mechanically fastened to a brake pad of a brake device, according to an exemplary embodiment of the present teachings.

FIG. 13 shows a side cross-sectional view of a brake insulator 549 having a layered structure mechanically fastened to a piston 510e and/or brake pad 520e, such as via a mechanical fastener 541, similar to the exemplary embodiment of FIG. 12. In the exemplary embodiment of FIG. 12, brake insulator 549 may include a different structure than brake insulator 539 of FIG. 11. For instance, brake insulator 549 may include a first metal layer 542, a bond layer 543, an insulation layer 544, a fabric layer 545, a bond layer 546, and a second metal layer 547, but with insulation layer 544 being located on the side of fabric layer 545 facing piston 540 instead of the side facing brake pad 548. Fabric layer 545, metal layers 542 and 547, insulation layer 544, and bond layers 543 and 546 may have the same thicknesses in directions 558 shown in FIG. 12 as discussed above for the corresponding layers of FIG. 8 (i.e., noise insulation layer 544 may have the same thickness as noise insulation layer 502, metal layers 542 and 547 may each have the same thickness as metal layer 506, fabric layer 545 may have the same thickness as fabric layer 504, and bond layers 543 and 546 may each have the same thickness as any of bond layers 503, 505, 507).

Although the exemplary embodiments of FIGS. 9-13 depict brake insulators that include only a single layer of fabric, the brake insulators may include a plurality of fabric layers, such as, for example, two, three, four, or more layers of fabric. The plural layers of fabric may be adjacent to one another in succession along a thickness direction of the brake insulators, the fabric insulators may be separated by other layers (i.e., metal layers, noise insulation layers, and/or bond layers), and/or a combination of adjacent fabric layers and separated fabric layers may be included in a brake insulator.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

This description and the accompanying drawings that illustrate exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A brake caliper, comprising:
   a caliper body;
   a piston positioned at least partially inside the caliper body; and
   a brake insulator comprising:
   two fabric layers, each fabric layer comprising a plurality of elements contacting one another to form a fabric structure, the fabric layers being arranged such that elements of a first fabric layer overlie interstices of an adjacent second fabric layer;
   a rubber layer, and
   a bond layer that is between one of the fabric layers and the rubber layer.

2. The brake caliper of claim 1, wherein the elements of each of the fabric layers comprise a polymer material.

3. The brake caliper of claim 2, wherein the polymer material is an aramid.

4. The brake caliper of claim 3, wherein the aramid is poly (m-phenylene isophthalamide).

5. The brake caliper of claim 1, wherein the fabric structure is a woven fabric.

6. The brake caliper of claim 1, wherein the fabric structure is a non-woven fabric.

7. The brake caliper of claim 1, wherein the plurality of elements are positioned relative to one another to create a plurality of interstices between the elements, wherein the interstices comprise air pockets.

8. The brake caliper of claim 1, the brake insulator further comprising a layer of metal.

9. The brake caliper of claim 1, further comprising a brake pad connected to the brake insulator.

10. The brake caliper of claim 6, wherein the non-woven fabric is a non-woven mesh or a non-woven felt.

11. The brake caliper of claim 1, wherein at least one fabric structure is adhesively bonded to a face of the piston with an air setting acrylic adhesive.

12. The brake caliper of claim 8, wherein the brake insulator further comprises a second layer of metal.

13. A brake caliper, comprising:
    a caliper body;
    a piston positioned at least partially inside the caliper body; and
    a brake insulator connected to the piston, the brake insulator comprising two fabric layers, each fabric layer consisting essentially of polymeric elements, wherein polymeric elements of a first fabric layer overlie interstices between polymeric elements of an adjacent second fabric layer.

14. The brake caliper of claim 13, wherein the brake insulator has a thickness of about 0.75 mm to about 1.5 mm.

15. The brake caliper of claim 13, wherein the polymeric elements comprise an aramid polymer.

16. The brake caliper of claim 13, wherein the polymeric elements of each fabric layer form a plurality of interstices therebetween, wherein the interstices comprise air pockets.

17. The brake caliper of claim 13, wherein each fabric layer is a woven fabric comprising the polymeric elements woven with one another.

18. The brake insulator of claim 13, wherein each fabric layer does not include bonding resin.

19. A brake insulator for a brake caliper, the brake insulator comprising:
    at least two fabric layers, each fabric layer consisting essentially of a plurality of elements positioned relative to one another to create a plurality of interstices between the elements, wherein:
    at least one fabric layer does not include a bonding resin;
    the interstices comprise air pockets;
    the fabric layers are oriented relative to one another such that elements of a first fabric layer overlie interstices of an adjacent second fabric layer; and
    the brake insulator has a thickness of about 0.75 mm to about 1.5 mm.

20. The brake insulator of claim 19, wherein each of the plurality of elements comprises a polymer material.

21. The brake insulator of claim 20, wherein the polymer material is an aramid.

22. The brake insulator of claim 21, wherein the aramid is poly (m-phenylene isophthalamide).

23. A vehicle, comprising:
    a wheel;
    a rotor coupled to the wheel; and
    a brake caliper configured to engage the rotor, the brake caliper comprising:
    a caliper body;
    a piston;
    a brake pad; and
    a brake insulator comprising:
    a plurality of fabric layers, each fabric layer including a plurality of elements contacting one another to form a fabric structure, wherein the plurality of fabric layers are staggered or offset from one another such that elements of a first fabric layer overlie interstices of an adjacent second fabric layer,
    a rubber layer, and
    a bond layer between one of the plurality of fabric layers and the rubber layer.

24. A brake caliper, comprising:
    a caliper body;
    a piston positioned at least partially inside the caliper body, the piston comprising a force transfer surface; and
    a brake insulator connected to the surface of the piston, the brake insulator comprising:
    more than one fabric layer, each fabric layer comprising a plurality of elements contacting one another to form a fabric structure,
    a metal layer, and
    a rubber layer that is separate from the fabric layers;
    wherein the fabric layers are staggered or offset from one another such that elements of a first fabric layer overlie interstices of an adjacent second fabric layer.

* * * * *